United States Patent [19]

Ostergren

[11] 4,241,879
[45] Dec. 30, 1980

[54] DRIVE SYSTEM FOR A MANURE SPREADER

[75] Inventor: William F. Ostergren, Terre Hill, Pa.

[73] Assignee: Sperry Corporation, New Holland, Pa.

[21] Appl. No.: 8,900

[22] Filed: Feb. 2, 1979

[51] Int. Cl.³ .................... A01C 19/00; F16H 7/08; F16H 55/54
[52] U.S. Cl. ................... 239/677; 414/518; 414/528
[58] Field of Search ............... 74/230.17 R, 230.17 A, 74/230.17F; 414/518, 528; 198/854; 222/627; 239/665, 670, 672, 673, 677, 679, 684, 685; 192/0.032, 0.033

[56] References Cited

U.S. PATENT DOCUMENTS

| | | | |
|---|---|---|---|
| 2,699,337 | 1/1955 | Best | 239/677 |
| 3,156,124 | 11/1964 | Miller | 239/677 X |
| 3,172,554 | 3/1965 | Fickle | 239/677 |
| 3,448,930 | 6/1969 | Lepp et al. | 239/685 |
| 3,515,010 | 6/1970 | Wagstaff et al. | 74/230.17 R |
| 3,722,306 | 3/1973 | Campbell et al. | 239/677 X |
| 3,722,307 | 3/1973 | Campbell | 239/677 X |
| 3,731,549 | 5/1973 | Kaiser et al. | 74/230.17 F X |
| 4,196,859 | 4/1980 | Trott et al. | 239/677 |

OTHER PUBLICATIONS

"Manure Handling Equipment", Brochure Published by John Deere, 1977.

Primary Examiner—Andres Kashnikow
Attorney, Agent, or Firm—Larry W. Miller; Frank A. Seemar

[57] ABSTRACT

A novel drive system for a manure spreader is disclosed wherein an infinitely adjustable variable speed drive mechanism transfers power from the power input shaft to the apron assembly and a constant speed drive mechanism transfers power from the same power input shaft to the beater assembly. A bypass mechanism allows for an extension of the hydraulic cylinder controlling a cam device, used for varying the speed of the apron drive mechanism, without activation of the cam device when the power input shaft is not engaged for rotation of the drive system. A tensioning idler connected to the cam device through a lost motion linkage provides for disengagement of the beater drive system during the cleanout of the manure spreader by the apron assembly. A drive shaft to the beater assembly is included inside of a tubular drive shaft to the apron assembly, whereby a concentric drive line assembly transfers power rearwardly to the driven assemblies.

24 Claims, 10 Drawing Figures

DRIVE SYSTEM FOR A MANURE SPREADER

BACKGROUND OF THE INVENTION

The present invention relates generally to manure spreaders and, more particularly, to a drive system for providing rotational power to the moving components of a manure spreader, namely, the apron assembly and the widespread discharge means commonly referred to as the beater assembly.

Manure spreaders heretofore manufactured utilize a finitely variable drive system to transfer power to the rotatable components. One type of drive system is described in U.S. Pat. No. 3,722,306 granted to W. R. Campbell et al. and in U.S. Pat. No. 3,722,307 granted to W. R. Campbell, both of which issued Mar. 27, 1973. Typical of such spreaders, rotational power is delivered rearwardly from the tractor, from which the manure spreader trails, via a power input shaft.

A pulley attached to the power input shaft transfers the rotational power to a second pulley by means of a drive belt interconnecting the two pulleys. The second pulley is attached to a drive shaft running along the outside of the spreader. This drive shaft runs directly into a gearbox driving the beater assembly. The apron assembly is driven off this rotating drive shaft through a transmission mechanism and jaw clutch which is finitely variable via a control linkage extending to the front of the machine.

Another known drive system for a manure spreader is commonly referred to as a ratchet drive. An example of this ratchet drive system can be found in U.S. Pat. No. 2,699,337 granted to A. M. Best on Jan. 11, 1955. The speed of the apron assembly is finitely adjustable according to the number of notches (or ratchet teeth) the coacting pawl is allowed to engage in one stroke of the pitman arm.

These drives have been found to be difficult to shift while operating under loaded conditions. When shifting is accomplished, shock loads are imposed on the drive line. Also, the finitely adjustable apron seeds may not be optimum for certain operating conditions. Moreover, finite adjustments are usually accomplished through a mechanical linkage mechanism which requires frequent maintenance and is susceptible to being easily damaged.

In addition, most present day manure spreaders require cycling the drive system completely through to the cleanout position before returning to the neutral position. Another disadvantage to manure spreaders with beater drive jaw clutches is that the operator is required to remember to disengage the tractor's power takeoff before going into the neutral position in order to prevent damage to the jaw clutch.

Other types of manure spreader drive systems are described in U.S. Pat. Nos. 3,156,124 and in 3,448,930. The former reference reveals a drive system which is also only finitely adjustable among predetermined speeds, while the latter reference exemplifies a ground driven drive system.

SUMMARY OF THE INVENTION

It is an object of this invention to provide a manure spreader drive system which overcomes the aforementioned disadvantages of the prior art.

It is another object of this invention to provide a design which can be manufactured and utilized simply and inexpensively.

It is another object of this invention to provide a manure spreader drive system which allows the speed of the apron assembly to be infinitely adjustable along the entire range of speeds considered to be desirable for manure spreaders.

It is a feature of this invention to locate all control functions at the front of the manure spreader.

It is an advantage of this invention to eliminate the need for linkages or cables to extend to the rear of the manure spreader.

It is still another object of this invention to provide for a declutching of the drive to the beater assembly by the controlling belt tensions in the drive system.

It is another advantage of this invention to eliminate the need for jaw type clutches.

It is another feature of this invention to stop the rotation of the beater assembly during the cleanout phase.

It is a further object of this invention to synchronize the functions of the apron drive and the beater drive on a manure spreader.

It is still another feature of this invention that all control functions can be accomplished through a single hydraulic cylinder.

It is a further feature of this invention to provide an easily visible indicator displaying which mode of operation the manure spreader drive system is in.

It is a still further object of this invention to provide the capability of changing the position of operation without having to cycle through the entire sequence of positions.

It is still another advantage of this invention in providing a means to synchronize an automatic release of the fine material pan with the operation of the manure spreader drive system.

It is a further advantage of this invention to reduce the amount of adjustment and operator attention necessary for proper operation of a manure spreader drive system.

It is a still further object of this invention to provide a drive system for a manure spreader which is durable of construction, inexpensive of manufacture, carefree of maintenance and effective in use.

These and other objects, features and advantages are accomplished according to the instant invention by providing a novel drive system for a manure spreader wherein an infinitely adjustable variable speed drive mechanism transfers power from the power input shaft to the apron assembly and a constant drive mechanism transfers power from the same power input shaft to the beater assembly. A bypass mechanism allows for an extension of the hydraulic cylinder controlling the cam device, used for varying the speed of the apron drive mechanism, without activation of the cam device when the power input shaft is not engaged for rotation of the drive system. A tensioning idler connected to the cam device through a lost motion linkage provides for disengagement of the beater drive system during the cleanout of the manure spreader by the apron assembly. A drive shaft to the beater assembly is included inside of a tubular drive shaft to the apron assembly, whereby a concentric drive line assembly transfers power rearwardly to the driven assemblies.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
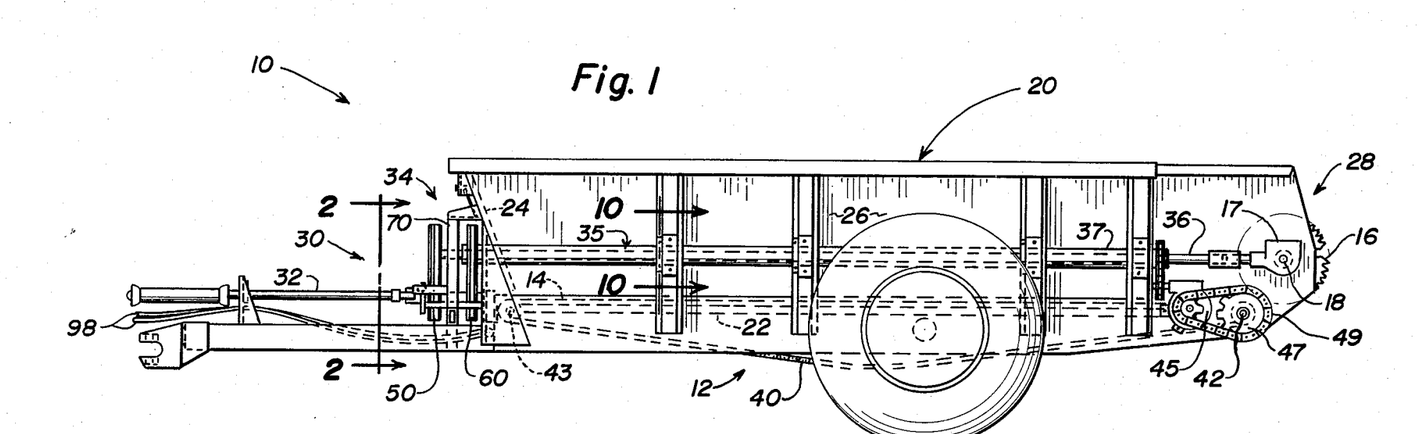
FIG. 1 is a side elevational view of manure spreader incorporating the instant invention.

Referring now to the drawings and particularly to FIG. 1, a side elevational view of a manure spreader can be seen. The manure spreader 10 is generally comprised of a mobile frame 12, a spreader box 20, a material conveying means 14, at least one beater assembly 16 and drive means 30.

GENERAL STRUCTURAL RELATIONSHIPS

The spreader box 20 is usually of the open ended type and, as such, is composed of a floor 22, a front endwall 24, two laterally spaced sidewalls 26 and an open rear discharge area 28. Normally, one or more beater assemblies 16 are rotatably journaled between the sidewalls 26 within the rear discharge area 28 for the widespread discharge and distribution of material from the spreader box 20. Some models are equipped with as many as three beater assemblies such as the manure spreaders shown in U.S. Pat. No. 4,026,476 issued to Ipnar et al. on May 31, 1977. As a matter of convenience, FIG. 1 displays a single beater assembly manure spreader. It should be realized by one skilled in the art that this invention is not limited by the number of beater assemblies disposed on the manure spreader.

Usually, the material conveying means 14 is a slatted apron assembly 40 which operates along the floor 22 to transport material rearwardly for engagement with the beater assembly 16. The material conveying means 14 is drivable by rotational forces applied to the apron shaft 42 through sprocket 47 which is interconnected with a reduction gearbox 45 via a chain 49. The reduction gearbox 45 reduces the speed of the rotational forces delivered thereto before transferring to sprocket 47 so that the apron assembly 40 will operate within an acceptable range of speeds. An idler shaft 43 adjacent the front endwall 24 enables the endless belt-like apron assembly 40 to make a circuitous route around the floor 22.

The beater assembly 16 is likewise driven by rotational forces delivered to gearbox 17 connected to the beater shaft 18. It should also be realized by one skilled in the art that the instant invention is not limited by the manner in which the rotational forces are applied to the beater and apron assemblies once delivered for application thereto. The use of the gearbox 17 and the reduction gearbox 45 in conjunction with the driving of the beater assembly 16 and apron assembly 40, respectively, is revealed in the aforementioned U.S. Pat. No. 3,722,307.

In general, the drive means 30 normally consists of a power input shaft 32 which provides an input of rotational power to the drive means 30, a power transfer mechanism 34 and a drive shaft assembly 35 which delivers rotational forces to the beater and apron assemblies 16, 40. The power transfer mechanism 34 includes two separately functional subdrive systems, a beater drive system 50 and an apron drive system 60. The drive shaft assembly 35 includes a beater drive shaft 36 extending from the beater drive system 50 and an apron drive shaft 37 extending from the apron drive system 60.

Figure 3:
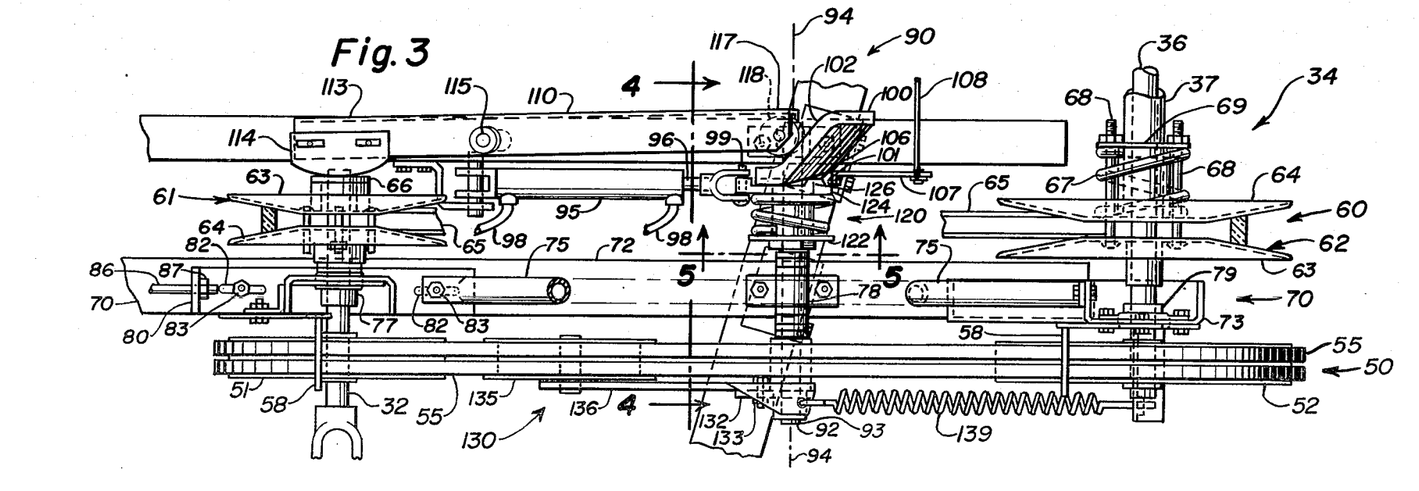
FIG. 3 is a top plan view of the power transfer portion of the drive system located at the forward end of the manure spreader as shown in FIG. 2 being indicated by line 3—3.

Support for the power transfer system 34, as seen best in FIG. 3, is provided by an L-shaped main support member 70 connected to the frame 12. A diagonal member 75 interconnecting the horizontal leg 72 and the vertical leg 73 of the main support member 70 adds further support and stability for the power transfer system 34.

APRON DRIVE SYSTEM

As can be best seen in a top plan view in FIG. 3, the apron drive system 60 is a variable speed drive system including a first variable diameter sheave 61 attached to the power input shaft 32, a second variable diameter sheave 62 attached to the apron drive shaft 37, and an apron drive belt 65 interconnecting the two variable diameter sheaves 61, 62. The effective diameter of the first variable diameter sheave 61 is controlled by a cam actuating mechanism 90. A spring 67, which reacts in opposition to the tension in the apron drive belt 65, controls the effective diameter of the second variable diameter sheave 62.

The hydraulic cylinder 95, connected to and activated by an external hydraulic system (not shown) through hydraulic hoses 98, operates the cam actuating mechanism 90 from a single external control (also not shown). The hydraulic cylinder rod 96 is connected to the cam actuating mechanism 90 by a pin 99 in such a manner that extension of rod 96 causes rotation of the cam actuating mechanism 90 about an axis 94 corresponding to cam shaft 92.

The cam actuating mechanism 90 includes a cam device 100, the cam shaft 92, a bypass mechanism 120 and a pivot arm 110. The pivot arm 110 is pivotally attached to the frame 12 at a predetermined point 115 along the length thereof, thereby allowing a pivotal movement of the pivot arm 110 about pivot point 115. The sheave end 113 of the pivot arm 110 has an engaging member 114 extending therefrom which contacts the first variable diameter sheave 61 to force movement of a mobile half 63 of sheave 61 towards the stationary half 64. A thrust bearing 66 allows the mobile half 63 to rotate during any movement relative to the stationary half 64. A roller 118, attached to the actuating end 117 of the pivot arm 110, contacts the cam device 100 and travels along the inclined ramp 102 upon rotation of the cam actuating mechanism 90 by the hydraulic cylinder 95.

Figure 4:
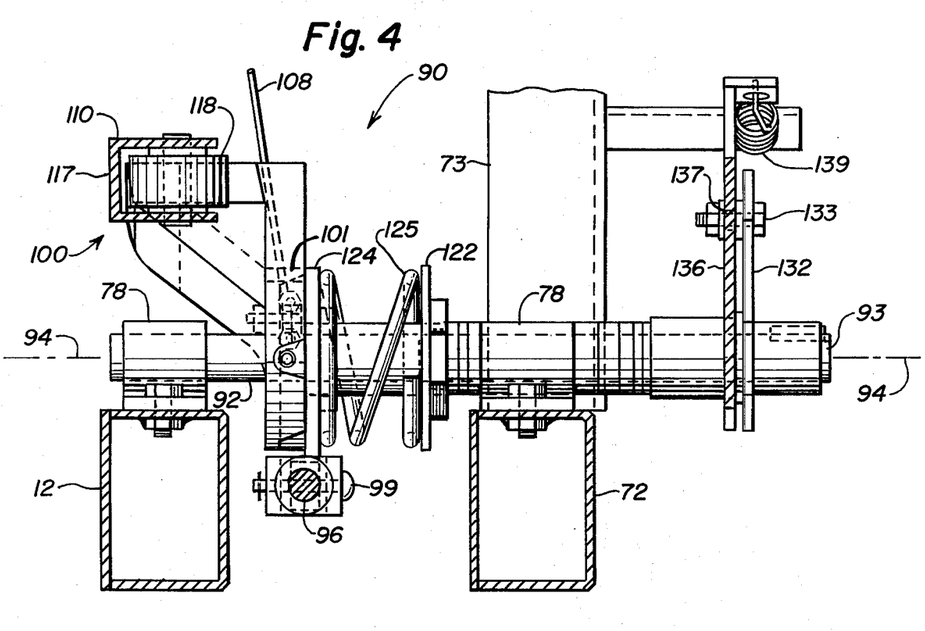
FIG. 4 is an enlarged cross sectional view of the cam actuating mechanism shown in FIG. 3 taken along line 4—4.

The bypass mechanism 120 is a safety device for preventing damage to any of the components of the drive means 30 if the rod 96 is extended without the apron drive belt 65 being in motion. The bypass mechanism 120, as best seen in an enlarged cross sectional view in FIG. 4 and in the top plan view of FIG. 3, includes a bypass spring 125 which interconnects the base portion 122 and a ring-like collar 124. The base portion 122 is an extension of the cam device 100, thereby allowing a cancellation of the spring forces from the bypass spring 125. The collar 124, which has a rib 126 thereon to interfit a groove 106 formed in the base 101 of the cam device 100, is forced away from the base portion 122 and into engagement with the base 101 of the cam device 100 by the bypass spring 125.

Figure 7:
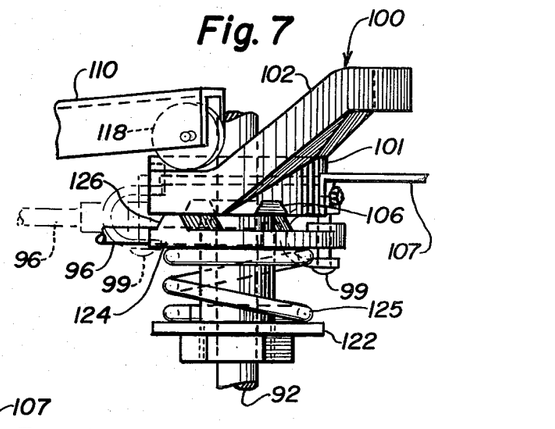
FIG. 7 is an enlarged partial top plan view of the mechanism of FIG. 6 showing a disengagement of the bypass mechanism from the cam device, the phantom lines indicating the initial position of the bypass mechanism.

In normal operation, when the apron drive belt 65 is rotating, the extending rod 96 rotates the collar 124 which in turn rotates the cam device 100. If the apron drive belt 65 is not rotating, the force required to rotate the cam device 100 (and thereby damage one or more of the components) is greater than the force exerted by the bypass spring 125. As can be seen in FIG. 7, the bypass spring 125 then yields allowing the rib 126 to slip out of the corresponding groove 106, which is to say, the collar 124 disengages from the cam device 100. Consequently, the collar 124 rotates harmlessly around the cam shaft 92. A retraction of the rod 96 permits the collar 124 to become re-engaged with the cam device 100 for subsequent operation thereof. It should be noted that the phantom lines of FIG. 7 indicate the initial position of the rod 96 prior to the aforementioned disengagement.

Referring now to FIG. 1, it can be seen that the apron drive shaft 37 is a hollow tube-like member extending to the apron assembly 40 from the apron drive system 60. As can be seen in FIG. 3, rotation of the apron drive shaft 37 is effected by rotation of the second variable diameter sheave 62. A base bracket 69 is attached to the mobile half 63 of the variable diameter sheave 62 by connecting bolts 68 which slide through the stationary half 64 such that the base bracket 69/mobile half 63 combination is moveable relative to the stationary half 64 which in turn is affixed to the apron drive shaft 37. The spring 67 forces the base bracket 69 away from the stationary half 64, thereby forcing the mobile half 63 of the variable diameter sheave 62 toward the stationary half 64. Tension forces in the apron drive belt 65, caused by an increase in the effective diameter of the first variable diameter sheave 61, cause the mobile half 63 of the second variable diameter sheave 62 to move away from the stationary half 64 against the force exerted by the resisting spring 67.

BEATER DRIVE SYSTEM

Figure 2:
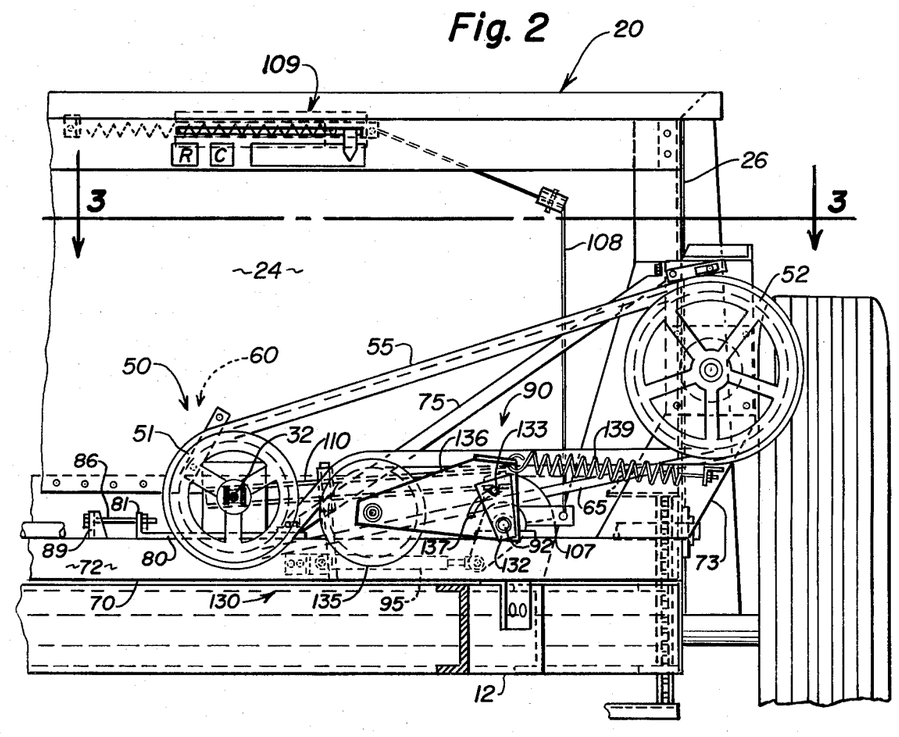
FIG. 2 is a partial front end view of the manure spreader of FIG. 1 as indicated by line 2—2, the power input shaft and hitch member being broken away.

As can best be seen in a frontal view in FIG. 2 and in a top view in FIG. 3, the beater drive system 50 is a constant speed drive system including a first pulley 51 attached to the power input shaft 32, a second pulley 52 attached to the beater drive shaft 36, and a beater drive belt 55 interconnecting the two pulleys 51, 52. A tensioning mechanism 130 serves as a declutching device operable by reducing the tension in the beater drive belt 55.

The tensioning mechanism 130 includes an idler pulley 135 and a support bracket 136. The idler pulley 135 engages the beater drive belt 55 to control the tension therein, while the support bracket 136 extends from the idler pulley 135 to rotatably connect with the cam shaft 92. The support bracket 136 includes a semi-circular slot-shaped hole 137 concentric with the cam shaft 92 to serve as a lost motion mechanism.

A lost motion bracket 132 is affixed to the end 93 of cam shaft 92. An extension 133 protrudes from the lost motion bracket 132 through the slot-shaped hole 137 and is free to slide within the slot-shaped hole 137 without causing any movement of the support bracket 136. An elongate spring 139 interconnects the frame 12 and the support bracket 136 to provide a force for keeping the idler pulley 135 in a position to maintain tension in the beater drive belt 55.

Referring particularly to FIG. 3, it can be seen that the power input shaft 32 is rotatably journaled within a bearing 77 affixed to an L-shaped bracket 80 which has two slots 82 through which clamping bolts 83 attach the L-shaped bracket 80 to the main support member 70. An adjusting bolt 86, extending from a brace 89 projecting from the horizontal leg 72 of the main support member 70, interconnects the short vertical leg 81 of the L-shaped bracket 80. A nut 87 secures the adjusting bolt 86 to the L-shaped bracket 80. The cam shaft 92 and drive shaft assembly 35 are also rotatably journaled within bearings 78 and 79, respectively.

An adjustment of the first variable diameter sheave 61 and the first pulley 51 can be made toward or away from the second variable diameter sheave 62 and the second pulley 52 to maintain proper tension in the apron drive belt 65 through a loosening of the clamping bolts 83 and a proper adjustment of nut 87 on the adjusting bolt 88.

Figure 10:
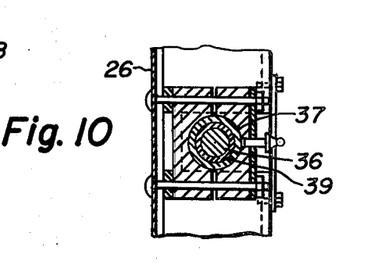
FIG. 10 is an enlarged cross sectional view of the drive shaft assembly displaying the spacer between the beater and apron drive shafts shown in FIG. 1 indicated by line 10—10.

As best seen in FIGS. 1 and 10, the beater drive shaft 36 is set within the apron drive shaft 37 and rotates independently therefrom. Spacers 39, intermittently placed along the length of the drive shaft assembly 35, separate the beater drive shaft 36 from the apron drive shaft 37. Referring now to FIG. 3, two slack pins 58, one adjacent the first pulley 51 and the other adjacent the second pulley 52, keep the beater drive belt 55 on the respective pulleys 51 and 52 during the slack condition created by a disengagement of the tensioning mechanism 130 from the beater drive belt 55.

OPERATION

Prior to placing the drive means 30 into operation, the hydraulic cylinder 95 is fully retracted; the engaging member 124 of the bypass mechanism 120 is engaged with the cam device 100; the first variable diameter sheave 61 is at the smallest effective diameter with the mobile half 63 being at the most distant allowable position from the stationary half 64; the second variable diameter sheave 62 is at the largest possible effective diameter since there is not enough tension in the apron drive belt 65 to overcome the force exerted by the spring 67; and the idler pulley 135 is in engagement with the beater drive belt 65, thereby placing tension in the beater drive belt 65 and allowing the transfer of any rotational power from the first pulley 51 to the second pulley 52. The initial position of the cam device 100 is shown by solid lines in a frontal view in FIG. 5 and in a top view in FIG. 6, while the initial position of the tensioning mechanism 130 is shown in the frontal view of FIG. 8.

To initially engage the drive means 30, the power input shaft 32 is engaged for rotation. The power input shaft 32 rotates at a constant speed which, by means of the beater drive system 50, causes the beater assembly 16 to rotate at a constant speed. The apron assembly 40 is moving at the slowest speed possible since the first variable diameter sheave 61 is at the smallest possible effective diameter and the second variable diameter sheave 62 is at the largest possible effective diameter.

To increase the speed of the apron assembly 40, the operator manipulates the external hydraulic system to extend the rod 96 of the hydraulic cylinder 95, thereby causing the cam device 100 to rotate since it is engaged with the bypass mechanism 120. As the cam device 100 rotates, the roller 118 climbs the inclined ramp 102 forcing a pivotal motion of the pivot arm 110. The engaging member 114 then forces the mobile half 63 of the first variable diameter sheave 61 toward the stationary half 64.

As a result, the rotating apron drive belt 65 moves outward from the power input shaft 32, thereby increasing the effective diameter of the first variable diameter sheave 61. Simultaneously, the increasing tension exerted on the apron drive belt 65 forces the mobile half 63 of the second variable diameter sheave 62 away from the stationary half 64 by overcoming the force exerted by the spring 67. As will be readily realized by one skilled in the art, the speed of the apron assembly 40 is infinitely variable over the entire range of speeds permitted by the apron drive system 60 through controlling the amount of extension of rod 96.

Figure 5:
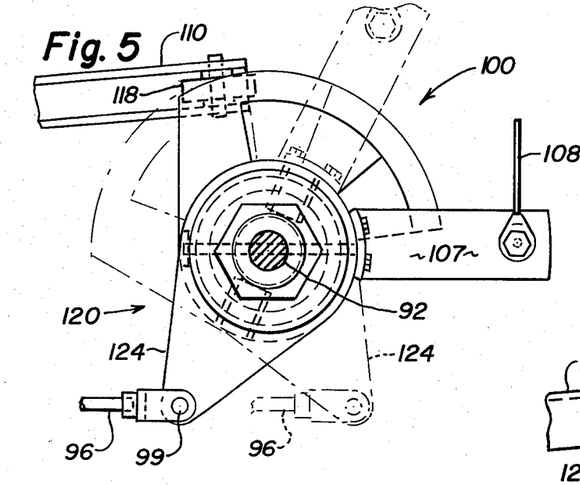
FIG. 5 is an enlarged cross sectional view of the cam actuating mechanism shown in FIG. 3 taken along line 5—5, the maximum speed position, as effected by an extension of the hydraulic cylinder rod, being shown in phantom.
Figure 6:
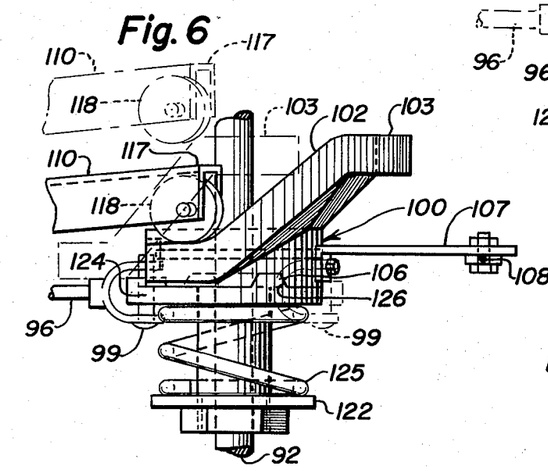
FIG. 6 is an enlarged partial top plan view showing the cam actuating mechanism, the maximum speed position being shown in phantom.
Figure 9:
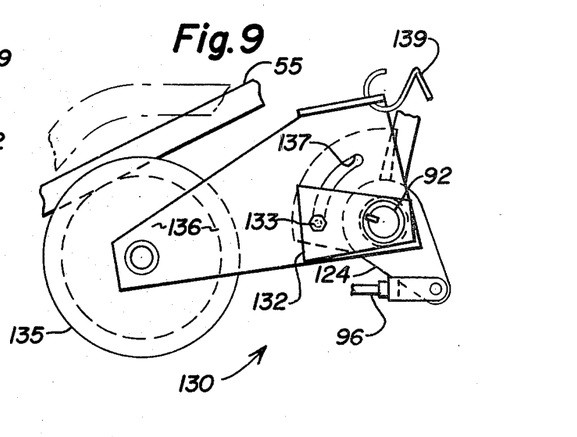
FIG. 9 is an enlarged front end view of the tensioning mechanism showing the declutching position effected by a rotation of the cam actuating mechanism, thereby removing the tension from the beater drive belt.

As seen in phantom in FIGS. 5 and 6, when the roller 118 has been positioned at the top 103 of the inclined ramp 102, the operator may elect to effect a cleanout of the spreader box 20 by the apron assembly 40 without operation of the beater assembly 16. Further rotation of the cam device 100, by a greater extension of the rod 96, causes a corresponding rotation of the cam shaft 92 until the extension 133 of the lost motion bracket 132 has reached the end of the semi-circular slot-shaped hole 137 in the support bracket 136. Then, as shown in FIG. 9, an even further rotation of the cam device 100 and cam shaft 92 will cause a rotation of the tensioning mechanism 130, thereby disengaging the idler pulley 135 from the beater drive belt 55, at which time, the beater assembly 16 stops rotating and the apron assembly 40 effects a cleanout of the spreader box 20 at the greatest possible speed.

To return the drive means 30 to the initial position, the rod 96 is fully retracted, causing the cam device 100 and cam shaft 92 to rotate back to the starting position. As the extension 133 proceeds along the semi-circular slot-shaped hole 137, the elongate spring 139 returns the tensioning mechanism 130 into engagement with the beater drive belt 55. Also, as the cam device 100 rotates backwards, the roller 118 returns down the inclined ramp 102, thereby reducing the speed of the apron assembly 40 to the slowest desirable speed.

Figure 8:
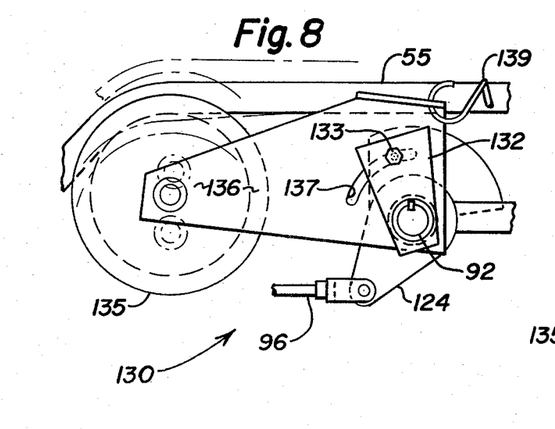
FIG. 8 is an enlarged front end view of the tensioning mechanism, the phantom lines showing the normal operational movement responsive to the tension in the beater drive belt.

In addition, FIG. 8 shows the range of normal operating positions between the tensioning mechanism 130 and the beater drive belt 55. The phantom lines indicate the freedom of movement of the tensioning mechanism 130 in response to the tension forces in the beater drive belt 55. The tensioning mechanism 130 operates at an equilibrium between the forces exerted by the elongate spring 139 and the tension forces in the beater drive belt 55. The variety of loads which can be imposed on the beater drive belt 55 result in the varying positional relationships as depicted in phantom in FIG. 8; while the phantom lines in FIG. 9 indicate the approximate position of the beater drive belt 55 during normal operations.

Furthermore, as seen in FIGS. 2, 3, 5 and 6, it is possible to attach a rotation arm 107 to the cam device 100. A cable 108 leading from the rotation arm 107 activates an indicator device 109 which visually displays the speed of the apron assembly 40 and the phase of operation of the drive means 30. Another modification (not shown) of this drive means 30 is to connect another cable to the cam device 100 in such a manner as to effect an automatic opening of an optional fine material pan when entering the cleanout phase of operation.

It will be understood that various changes in the details, materials, steps and arrangements of parts which have been described and illustrated in order to explain the nature of the invention will occur to and may be made by those skilled in the art upon a reading of the disclosure within the principles and scope of the invention.

Having thus described the invention, what is claimed is:

1. In a manure spreader having a mobile frame, a spreader box mounted on the frame with a floor, opposing sides, a forward endwall and a rear discharge opening, a material discharge means mounted on the spreader box adjacent the discharge opening for the widespread discharge and distribution of the material from the box, material conveying means at least partly within the spreader box for moving material in the box toward the material discharge means, and drive means for receiving rotational power input and transferring same to the material discharge means and material conveying means, the improvement wherein said drive means comprises:
   an input drive shaft rotatably supported on said frame adapted to receive rotational power from a prime mover;
   first drive means operably interconnecting said input drive shaft and said material discharge means;
   second drive means operably interconnecting said input drive shaft and said material conveying means; and
   control means supported on said frame and operably connected to said first and second drive means to selectively infinitely vary the speed of operation of said material conveying means over a predetermined range of speeds from a first slow speed to a second high speed without changing the rate of speed of said material discharge means.

2. The manure spreader of claim 1 wherein said first drive means includes:
   a first output drive shaft operably connected to said material discharge means;
   a first pulley affixed to said input drive shaft for rotation therewith;
   a second pulley affixed to said first output drive shaft for rotation thereof; and
   a first power transfer means interconnecting said first pulley and said second pulley for transferring rotational power therebetween, said control means including a declutching mechanism for selectively disengaging said first drive means to completely stop said material discharge means after said second high speed is reached.

3. The manure spreader of claim 2 wherein said second drive means includes a variable speed drive means having:
   a second output drive shaft operably connected to said material conveying means;
   a first variable diameter sheave affixed to said input drive shaft for rotation therewith;
   a second variable diameter sheave affixed to said second output shaft for rotation thereof; and
   a second power transfer means interconnecting said first variable diameter sheave and said second variable diameter sheave for transferring rotational power therebetween.

4. The manure spreader of claim 3 wherein said control means further includes:
   a rotatable cam shaft having an axis of rotation;
   a cam device, including a cam surface, connected to said cam shaft for rotation therewith about said axis of rotation;
   an actuating device for selectively rotating said cam device; and
   a pivot arm having a sheave end, a control end and an elongate portion therebetween, said sheave end being adjacent said first variable diameter sheave, said control end including a cam follower in contact with said cam surface, said pivot arm further having a pivot point on said elongate portion such that movement of said cam follower in response to variation of said cam surface causes said sheave end to vary the diameter of said first variable diameter sheave.

5. The manure spreader of claim 4 wherein said cam device includes a first engagement surface thereon adjacent said cam shaft, said manure spreader further including a bypass mechanism comprising:
   a base member affixed to said cam shaft and spaced from said first engagement surface;
   a collar slidably mounted on said cam shaft between said first engagement surface and said base member and having a second engagement surface thereon facing said first engagement surface, said actuating device being connected to said collar; and
   biasing means between said base member and said collar urging said first and second engagement surfaces together, whereby rotary motion imparted to said collar will be transferred to said cam device so long as the biasing force of said biasing means is greater than the force necessary to rotate said cam device.

6. The manure spreader of claim 5 wherein said actuating device is a hydraulic cylinder with an extensible rod attached to said collar to selectively cause rotation thereof.

7. The manure spreader of claim 6 wherein both said first output drive shaft and said second output drive shaft have a common axis of rotation.

8. The manure spreader of claim 7 wherein said second output drive shaft is a cylindrical tube-like member with a passageway therethrough, said first output drive shaft extending through said passageway, said first output drive shaft being rotatably journaled within said second output drive shaft.

9. The manure spreader of claim 8 wherein both said first power transfer means and said second power transfer means are drive belts.

10. The manure spreader of claim 9 wherein said declutching mechanism includes:
    a support bracket adjacent said first power transfer means;
    a tensioning idler rotatably journaled on said support bracket, said tensioning idler cooperating with said first power transfer means for controlling tension therein;
    an elongate spring-like means interconnecting said support bracket and said frame for maintaining said tensioning idler in engagement with said first power transfer means; and
    a lost motion means interconnecting said cam shaft and said support bracket for providing movement of said tensioning idler away from engagement with said first power transfer means after said cam device has rotated such that said second high speed has been reached.

11. A manure spreader comprising:
    a mobile frame adapted for movement across the field;
    a spreader box mounted on said frame, said spreader box having a floor, a front endwall, two opposing sidewalls and a generally open rear discharge area;
    a material conveying means at least partially operable within said spreader box for transporting material towards said rear discharge area;
    a material discharge means rotatably supported by said frame within said rear discharge area for the widespread discharge and distribution of material from said spreader box;
    an input drive shaft rotatably supported by said frame, said input drive shaft being adapted to receive rotational power from a prime mover;
    a first drive means operably interconnecting said input drive shaft and said material discharge means;
    a second drive means operably interconnecting said input drive shaft and said material discharge means; and
    a control means supported by said frame and operably connected to said first drive means and said second drive means for the infinitely selective varying of the speed of operation of said material conveying means over a predetermined range of speeds from a first slow speed to a second high speed and for completely stopping said material discharge means after said second high speed is reached without changing the rate of speed of said material discharge means.

12. The manure spreader of claim 11 wherein said first drive means includes a first output drive shaft, said second drive means includes a second output drive shaft, said first output drive shaft and said second output drive shaft having a common axis of rotation.

13. The manure spreader of claim 12 wherein said second output drive shaft is a cylindrical tube-like member with a passageway therethrough, said first output drive shaft extending through said passageway, said first output drive shaft being rotatably journaled within said second output drive shaft.

14. The manure spreader of claim 13 wherein said second drive means further includes a variable speed drive means having:
    a first variable diameter sheave affixed to said input drive shaft for rotation therewith;
    a second variable diameter sheave affixed to said second output shaft for rotation thereof; and a first power transfer means interconnecting said first variable diameter sheave and said second variable diameter sheave for transferring rotational power therebetween.

15. The manure spreader of claim 14 wherein said first drive means further includes:
a first pulley affixed to said input drive shaft for rotation therewith;
a second pulley affixed to said first output drive shaft for rotation thereof; and
a second power transfer means interconnecting said first pulley and said second pulley for transferring rotational power therebetween, said control means including a declutching mechanism for selectively disengaging said first drive means to completely stop said material discharge means after said second high speed is reached.

16. The manure spreader of claim 15 wherein said control means further includes:
a rotatable cam shaft having an axis of rotation;
a cam device, including a cam surface, connected to said cam shaft for rotation therewith about said axis of rotation;
an actuating device for selectively rotating said cam device; and
a pivot arm having a sheave end, a control end and an elongate portion therebetween, said sheave end being adjacent said first variable diameter sheave, said control end including a cam follower in contact with said cam surface, said pivot arm further having a pivot point on said elongate portion such that movement of said cam follower in response to variation of said cam surface causes said sheave end to vary the diameter of said first variable diameter sheave.

17. The manure spreader of claim 16 wherein said cam device includes a first engagement surface thereon adjacent said cam shaft, said manure spreader further including a bypass mechanism comprising:
a base member affixed to said cam shaft and spaced from said first engagement surface;
a collar slidably mounted on said cam shaft between aid first engagement surface and said base member and having a second engagement surface thereon facing said first engagement surface, said actuating device being connected to said collar; and
biasing means between said base member and said collar urging said first and second engagement surfaces together, whereby rotary motion imparted to said collar will be transferred to said cam device so long as the biasing force of said biasing means is greater than the force necessary to rotate said cam device.

18. The manure spreader of claim 17 wherein said declutching mechanism includes:
a support bracket adjacent said second power transfer means;
a tensioning idler rotatably journaled on said support bracket, said tensioning idler cooperating with said second power transfer means for controlling tension therein;
an elongate spring-like means interconnecting said support bracket and said frame for maintaining said tensioning idler in engagement with said second power transfer means; and
a lost motion means interconnecting said cam shaft and said support bracket for providing movement of said tensioning idler away from engagement with said second power transfer means after said cam device has rotated such that said second high speed has been reached.

19. The manure spreader of claim 18 wherein said actuating device is a hydraulic cylinder with an extensible rod attached to said collar to selectively cause rotation thereof and both said first power transfer means and said second power transfer means are drive belts.

20. A manure spreader comprising:
a mobile frame adapted for movement across a field;
a spreader box mounted on said frame, said spreader box having a floor, a front endwall, opposing sidewalls and a generally open rear discharge area;
a material conveying means at least partially operable within said spreader box for transporting material towards said rear discharge area;
a material discharge means rotatably supported by said frame within said rear discharge area for the widespread discharge and distribution of material from said spreader box;
an input drive shaft rotatably supported by said frame, said input drive shaft being adapted to receive rotational power from a prime mover;
a constant speed drive means having a first output drive shaft operably connected to said material discharge means, a first pulley affixed to said input drive shaft for rotation therewith, a second pulley affixed to said first output drive shaft for rotation thereof and a first power transfer means interconnecting said first pulley and said second pulley for transferring rotational power therebetween;
a variable speed drive means having a second output drive shaft operably connected to said material conveying means, a first variable diameter sheave affixed to said input drive shaft for rotation therewith, a second variable diameter sheave affixed to said second output drive shaft for rotation thereof and a second power transfer means interconnecting said first variable diameter sheave and said second variable diameter sheave for transferring rotational power therebetween; and
a control means supported by said frame and operably connected to said constant speed drive means and said variable speed drive means for the infinite selection of speed of operation of said material conveying means over a predetermined range of speeds from a first slow speed to a second high speed and for stopping said material discharge means after said second high speed is reached.

21. The manure spreader of claim 20 wherein said second output shaft is a cylindrical tube like member with a passageway therethrough, said first output shaft extending through said passageway, said first output shaft being rotatably journaled within said second output shaft, both said first and said second output drive shafts having a common axis of rotation.

22. The manure spreader of claim 21 wherein said control means further includes:
a rotatable cam shaft having an axis of rotation;
a cam device, including a cam surface, connected to said cam shaft for rotation therewith about said axis of rotation;
an actuating device for selectively rotating said cam device; and
a pivot arm having a sheave end, a control end and an elongate portion therebetween, said sheave end being adjacent said first variable diameter sheave, said control end including a cam follower in contact with said cam surface, said pivot arm further having a pivot point on said elongate portion such that movement of said cam follower in response to variation of said cam surface causes said sheave end to vary the diameter of said first variable diameter sheave.

23. The manure spreader of claim 22 wherein said cam device includes a first engagement surface thereon adjacent said cam shaft, said manure spreader further including a bypass mechanism comprising:
   a base member affixed to saic cam shaft and spaced from said first engagement surface;
   a collar slidably mounted on said cam shaft between aid first engagement surface and said base member and having a second engagement surface thereon facing said first engagement surface, said actuating device being connected to said collar; and
   biasing means between said base member and said collar urging said first and second engagement surfaces together, whereby rotary motion imparted to said collar will be transferred to said cam device so long as the biasing force of said biasing means is greater than the force necessary to rotate said cam device.

24. The manure spreader of claim 23 wherein both said first and second power transfer means are drive belts, said actuating device being a hydraulic cylinder with an extensible rod attached to said collar to selectively effect rotation thereof.

* * * * *